United States Patent
Chen et al.

(10) Patent No.: US 11,364,801 B2
(45) Date of Patent: Jun. 21, 2022

(54) SYSTEM AND METHOD FOR DETECTING AND PREVENTING DRIVING OF A VEHICLE BY A DRUNKEN DRIVER

(71) Applicant: Goldtek Technology Co., Ltd., New Taipei (TW)

(72) Inventors: Shih-Chang Chen, New Taipei (TW); Kuang-Hui Su, New Taipei (TW)

(73) Assignee: Goldtek Technology Co., Ltd., New Taipei (TW)

( * ) Notice: Subject to any disclaimer, the term of this patent is extended or adjusted under 35 U.S.C. 154(b) by 502 days.

(21) Appl. No.: 16/545,255

(22) Filed: Aug. 20, 2019

(65) Prior Publication Data
US 2020/0338980 A1 Oct. 29, 2020

(30) Foreign Application Priority Data
Apr. 23, 2019 (TW) ................................ 108114214

(51) Int. Cl.
*B60W 50/14* (2020.01)
*B60K 28/06* (2006.01)
*B60W 40/08* (2012.01)

(52) U.S. Cl.
CPC .......... *B60K 28/063* (2013.01); *B60W 40/08* (2013.01); *B60W 50/14* (2013.01); *B60W 2040/0836* (2013.01); *B60W 2040/0872* (2013.01); *B60W 2420/42* (2013.01)

(58) Field of Classification Search
CPC ...... B60K 28/063; B60W 40/08; B60W 50/14; B60W 2040/0836; B60W 2040/0872; B60W 2420/42; B60W 2556/45
See application file for complete search history.

(56) References Cited

U.S. PATENT DOCUMENTS

| | | | |
|---|---|---|---|
| 2005/0163383 A1* | 7/2005 | Kim | G06V 40/18 382/209 |
| 2006/0215244 A1* | 9/2006 | Yosha | G02B 27/0101 359/15 |
| 2009/0090577 A1* | 4/2009 | Takahashi | G01N 33/4972 340/576 |
| 2009/0169068 A1* | 7/2009 | Okamoto | B60K 28/063 382/118 |
| 2011/0050407 A1* | 3/2011 | Schoenfeld | A61B 10/0051 340/426.11 |
| 2011/0292209 A1* | 12/2011 | Morley | B60K 28/063 348/148 |
| 2012/0055726 A1* | 3/2012 | Hannon | B60W 40/08 180/272 |

* cited by examiner

*Primary Examiner* — Munear T Akki
(74) *Attorney, Agent, or Firm* — ScienBiziP, P.C.

(57) ABSTRACT

A system for detecting drunken driver is presented. The system includes an alcohol detecting device, a photographing device, and a locking device. The alcohol detecting device can receive a blood alcohol content value of a driver of a vehicle detected by a sensor, and determine whether the blood alcohol content value exceeds a first predetermined value. The alcohol detecting device can send alcohol concentration exceeding information to the photographing device to record video and to the locking device to lock vehicle when the blood alcohol content value exceeds the first predetermined value.

16 Claims, 5 Drawing Sheets

SYSTEM AND METHOD FOR DETECTING AND PREVENTING DRIVING OF A VEHICLE BY A DRUNKEN DRIVER

FIELD

The subject matter herein generally relates to road safety.

BACKGROUND

Traffic accidents caused by drunk driver occur frequently, which cause physical and emotional injuries and are a significant cost to the society.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives. The term "comprises" means "including, but not necessarily limited to"; it specifically indicates open-ended inclusion or membership in a so-described combination, group, series, and the like.

Figure 1:
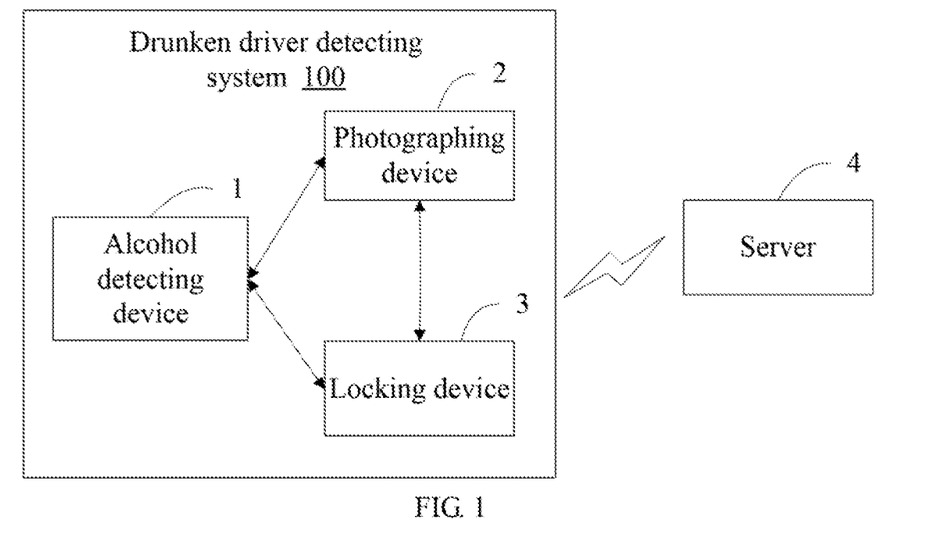
FIG. 1 illustrates a block diagram of one embodiment of a drunken driver detecting system.

FIG. 1 illustrates a system for detecting a drunken driver, that is to say the person is driving a vehicle or will drive a vehicle after drinking alcohol. The vehicle may be any form of transport including those in a fleet of hire cars, or a bus. Depending on the embodiment, the drunken driving detecting system 100 can include, but is not limited to, an alcohol detecting device 1, a photographing device 2, and a locking device 3. The photographing device 2 can include, but is not limited to, a display device 21.

In at least one exemplary embodiment, the alcohol detecting device 1 can detect blood alcohol content (BAC) value of a driver by analyzing the skin of the driver. The BAC value is determined by irradiating the skin with near infrared rays and measuring the amount of absorption of a certain wavelength in the reflected light by the skin.

In at least one exemplary embodiment, the alcohol detecting device 1 can also be a patch device attached to a steering wheel to detect the BAC value of the driver when the driver puts his hands on the steering wheel.

In at least one exemplary embodiment, the alcohol detecting device 1 can also be a patch device attached to a steering wheel to detect the BAC value of the driver when the driver holds the steering wheel.

In at least one exemplary embodiment, the photographing device 2 can record video. The photographing device 2 may be in the form of a necklace and worn on neck of the driver. The photographing device 2 may also be mounted on a rear view mirror of a vehicle of the driver.

In at least one exemplary embodiment, the locking device 3 may be a steering wheel lock for locking the steering wheel or a brake lock for locking the brakes.

FIG. 1 illustrates only one example of the drunken driving detecting system 100, other examples can comprise more or fewer components that those shown in the embodiment, or have a different configuration of the various components. For example, the drunken driving detecting system 100 can include the alcohol detecting device 1, the photographing device 2, and the locking device 3, but not the display device 21.

Figure 2:
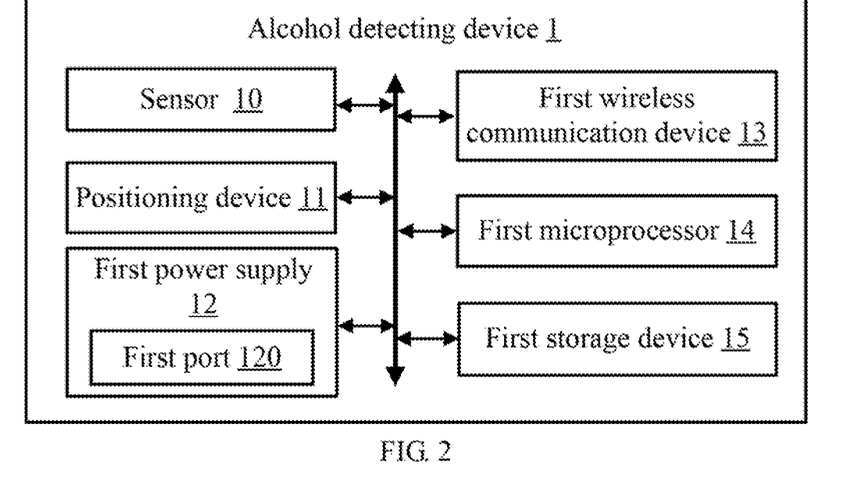
FIG. 2 illustrates a block diagram of one embodiment an alcohol detecting device of the system of FIG. 1.

FIG. 2 illustrates a block diagram of one embodiment of the alcohol detecting device 1. Depending on the embodiment, the alcohol detecting device 1 can include, but is not limited to, a sensor 10, a positioning device 11, a first power supply 12, a first wireless communication device 13, a first microprocessor 14, and a first storage device 15. The sensor 10, the positioning device 11, the first power supply 12, the first wireless communication device 13, the first microprocessor 14, and the first storage device 15 communicate with each other through a system bus.

In at least one exemplary embodiment, the first storage device 15 can be an internal storage device, such as a flash memory, a random access memory (RAM) for temporary storage, and/or a read-only memory (ROM) for permanent storage. The first storage device 15 can also be an external storage device, such as an external hard disk, a storage card, or a data storage medium. The at least one processor 14 can be a central processing unit (CPU), a processor, or other data processor chip that performs functions of the alcohol detecting device 1.

In at least one exemplary embodiment, the sensor 10 can be an alcohol detector for detecting the BAC value in the blood of the drive by making contact with the skin of the driver. The processor 14 can collect and record the BAC value and send the BAC value to the first storage device 15. The first storage device 15 can store the BAC value.

In other exemplary embodiment, the alcohol detecting device 1 can include other sensors. The other sensors can detect physiological parameters of the driver after drinking, and send the physiological parameters to a server 4. For example, the physiological parameters can include blood sugar, blood oxygen, vital capacity, heart rate and so on.

In at least one exemplary embodiment, the positioning device 11 can acquire location of the alcohol detecting device 1, and send the location of the alcohol detecting device 1 to the processor 14. When the driver carries the alcohol detecting device 1, or it is fixed in the vehicle, the location of the alcohol detecting device 1 acquired by the positioning device 11 indicates as the geographic location information of the driver. The positioning device 11 can be a GPS. The processor 14 can collect and record the location detected by the positioning device 11 and send the location to the first storage device 15. The first storage device 15 can store the location.

In at least one exemplary embodiment, the first power supply 12 can provide power to the alcohol detecting device 1. In this embodiment, the first power supply 12 can be a rechargeable battery. The first power supply 12 further includes a first port 120, which can be electrically connected to an external power source through a transmission line to implement charging. The first port 120 can be, but not limited to, a USB port.

In at least one exemplary embodiment, the first wireless communication device 13 can establish a wireless communication connection with the photographing device 2 and the locking device 3. The first microprocessor 14 can transmit to the photographing device 2, by the first wireless communication device 13, information of the alcohol concentration as read by the sensor 10. In this embodiment, the wireless communication mode of the first wireless communication device 13 may include, but is not limited to, ZIGBEE, Sub 1 GHz, BLUETOOTH, WI-FI, NB-IoT, RoLA, LTE-M, and so on. In another embodiment, the first wireless communication device 13 can also establish a wireless communication connection with the server 4. The first microprocessor 14 can transmit the BAC value detected by the sensor 10 to the server 4 by the first wireless communication device 13. The server 4 also can store the BAC value.

In at least one exemplary embodiment, the first microprocessor 14 is electrically connected to the sensor 10, the positioning device 11, the first power supply 12, the first wireless communication device 13, and the first storage device 15. The first microprocessor 14 can control the components and devices and process the data sent from the components and devices. The first microprocessor 14 can receive the BAC value detected by the sensor 10 and the location detected by the positioning device 11. The first microprocessor 14 further can determine whether the driver is drunk according to the BAC value. The first microprocessor 14 can send information as an excessive BAC value to the photographing device 2 and send control information to the locking device 3.

In at least one exemplary embodiment, the first storage device 15 can store the BAC value and the location.

In at least one exemplary embodiment, the alcohol detecting device 1 includes an alcohol detecting sensor, which can detect blood alcohol concentration by contact with the skin of the driver. The alcohol detecting device 1 can acquire drinking habits of a driver by regularly detecting the BAC value. To avoid decreasing the accuracy of the BAC value detected by the alcohol detecting device 1 over long-term use, the alcohol detecting device 1 can be set as a removable device, such as a bracelet.

In other exemplary embodiment, the alcohol detecting device 1 further can include a prompting device (not shown). When the driver is detected to have drunk alcohol but the BAC value is less than a first predetermined value, the prompting device can send a timely warning to the driver. For example, the prompting device can remind the driver by vibrating or loudspeaking not to drink excessively. The alcohol detecting device 1 can automatically record the daily alcohol content of the driver based on the BAC value and transmit the BAC value to the server 4, which can analyze health status of the driver according to the BAC value. The alcohol detecting device 1 further can alert the driver by analyzing the stored health status information and the BAC value. For example, when the BAC value is greater than a threshold that the liver of the driver can withstand (more than 90% of the alcohol in the drinking alcohol is metabolized in the liver), the server 4 can feed back excessive drinking information to the alcohol detecting device 1. And the alcohol detecting device 1 can activate the prompting device to emit a prompt tone to remind the driver to stop drinking, so as to avoid liver discomfort.

Figure 3:
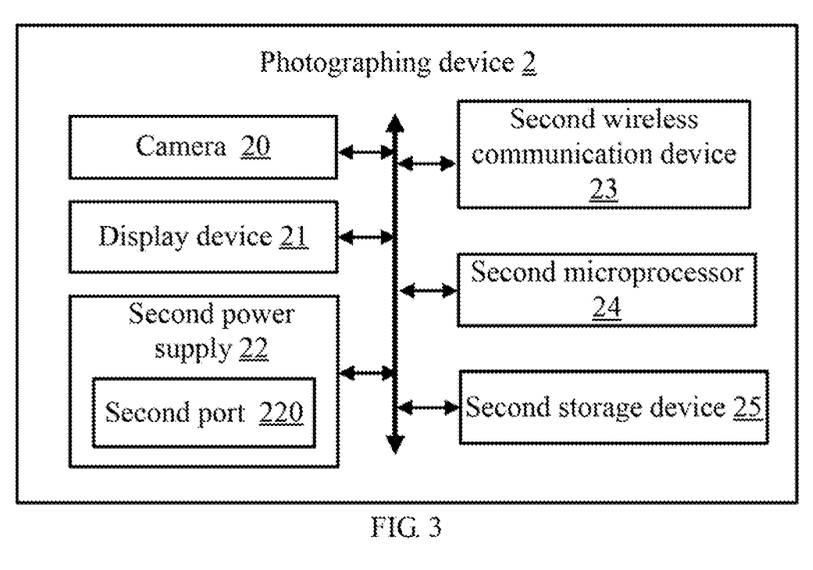
FIG. 3 illustrates a block diagram of one embodiment a photographing device of the system of FIG. 1.

FIG. 3 illustrates a block diagram of one embodiment of the photographing device 2. Depending on the embodiment, the photographing device 2 can include, but is not limited to, a camera 20, a display device 21, a second power supply 22, a second wireless communication device 23, a second microprocessor 24, and a second storage device 25. The camera 20, the display device 21, the second power supply 22, the second wireless communication device 23, the second microprocessor 24, and the second storage device 25 communicate with each other through a system bus.

In at least one exemplary embodiment, the camera 20 can record video of the driver for various purposes, for example, the clarification and tracking of subsequent accidents. The camera further can send the video to the server 4. The server 4 can record the time when the driver closing eyes by analyzing the video, and combine driving conditions of the vehicle and the recorded time to determine the drinking situation of the driver.

In at least one exemplary embodiment, the display device 21 can display base information of the driver. For example, the base information can include name and age of the driver. The display device 21 further can display emergency contact information of the driver. The emergency contact information can include an emergency contact name and a phone number. The display device 21 can display the emergency contact information after receiving a control command from the alcohol detecting device 1, when the alcohol detecting device 1 determines that the BAC value of the driver exceeds the first predetermined value. In this embodiment, the display device 21 may be a LCD display.

In at least one exemplary embodiment, the second power supply 22 can provide power to the photographing device 2. In this embodiment, the second power supply 22 can be a rechargeable battery. The second power supply 22 further includes a second port 220, which can be electrically connected to an external power source through a transmission line to implement charging. The second port 220 can be, but is not limited to, a USB port.

In at least one exemplary embodiment, the second wireless communication device 23 can establish a wireless communication connection with the alcohol detecting device 1 and the locking device 3. The second microprocessor 24 can transmit pictures and/or video to the server 4 by the second wireless communication device 23. In this embodiment, the wireless communication modes include those already described.

In at least one exemplary embodiment, the second microprocessor 24 is electrically connected to the camera 20, the display device 21, the second power supply 22, the second wireless communication device 23, and the second storage device 25. The second microprocessor 24 can control the components and devices and process the data sent from the components and devices. The second microprocessor 24 can receive the pictures and/or video.

In at least one exemplary embodiment, the second storage device 25 can store the pictures and/or video.

Figure 4:
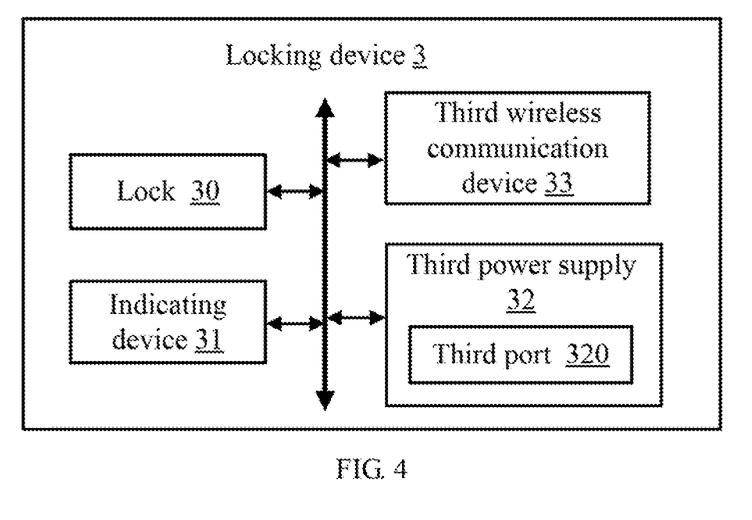
FIG. 4 illustrates a block diagram of one embodiment a locking device of the system of FIG. 1.

FIG. 4 illustrates a locking device 3. Depending on the embodiment, the locking device 3 can include, but is not limited to, a lock 30, an indicating device 31, a third power supply 32, and a third wireless communication device 33. The lock 30, the indicating device 31, the third power supply 32, and the third wireless communication device 33 communicate with each other through a system bus.

In at least one exemplary embodiment, the lock 30 can lock or otherwise disable a vehicle. The lock 30 can be an electronic lock or a mechanical lock. The lock 30 can lock a throttle and/or a brake and/or a steering wheel of the vehicle when the locking device 3 receives the alcohol concentration exceeding information. Then, the driver cannot drive the vehicle. For example, when the driver is driving a locomotive, the lock 30 can lock the throttle and/or brake of the locomotive after receiving the alcohol concentration exceeding information from the alcohol detecting device 1. When the driver is driving a car, the lock 30 can lock the steering wheel and/or the brakes of the car after receiving the alcohol concentration exceeding information from the alcohol detecting device 1.

In at least one exemplary embodiment, the indicating device 31 can indicate a working state of the lock 30. The working state can include a locked state or an unlocked state. The indicating device 31 can be, but not limited to, an indicator light. The indicator light illuminates when the lock 30 is in the locked state and the indicator light is extinguished when the lock 30 is in the unlocked state.

In at least one exemplary embodiment, when the lock 30 is an electronic lock, the indicating device 31 can display the power reserve of the lock 30.

In at least one exemplary embodiment, the third power supply 32 can provide power to the locking device 3. In this embodiment, the third power supply 32 can be a rechargeable battery. The third power supply 32 further includes a third port 320, which can be electrically connected to an external power source through a transmission line to implement charging. The third port 320 can be, but is not limited to, a USB port.

In at least one exemplary embodiment, the third wireless communication device 33 can establish a wireless communication connection with the alcohol detecting device 1 and the photographing device 2. The locking device 3 can receive the BAC reading, including the amount exceeding the set level, from the alcohol detecting device 1 by the third wireless communication device 33, and lock the vehicle. In this embodiment, the wireless communication mode of the third wireless communication device 33 may include those previously described.

In at least one exemplary embodiment, it can be understood that the locking device 3 can also include a microprocessor (not shown) and a memory (not shown). The microprocessor of the locking device 3 can control the lock 30 to lock the vehicle or unlock the vehicle. The memory of the locking device 3 can store commands received and details of an excess of alcohol in a BAC reading.

In at least one exemplary embodiment, the drunken driving detecting system 100 can transmit the detected BAC value to the server 4. Then, the server 4 can perform exclusive health analysis and care functions for the driver based on the BAC value. For example, the server 4 can acquire health status of the driver by analyzing the BAC value and physiological parameters. At the same time, for rescue or medical help purposes, the server 4 can warn necessary persons such as medical staff, as to location and state of driver.

Figure 5:
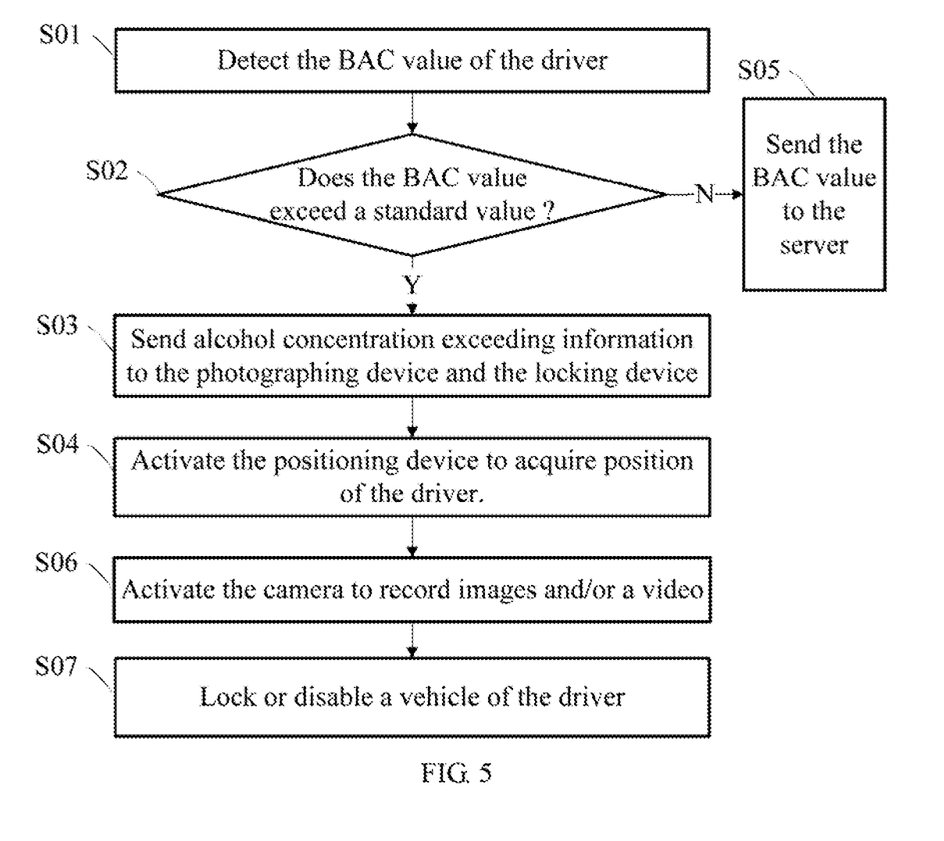
FIG. 5 illustrates a flowchart of one embodiment of a method for detecting a drunken driver using the system of FIG. 1.

FIG. 5 illustrates a flowchart of a method for preventing a drunken driver from driving. In an example embodiment, the method is performed by execution of computer-readable software program codes or instructions by the processor 14 of the electronic device 1.

Referring to FIG. 5, the method is provided by way of example, as there are a variety of ways to carry out the method. The method described below can be carried out using the configurations illustrated in FIG. 1, for example, and various elements of these figures are referenced in explaining method. Each block shown in FIG. 5 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S01.

At block S01, the alcohol detecting device 1 can detect the BAC value of the driver.

At block S02, the alcohol detecting device 1 can determine whether the BAC value exceeds a standard value. When the BAC value exceeds the standard value, the process goes to block S03. When the BAC value does not exceed the standard value, the process goes to block S05.

In at least one exemplary embodiment, the alcohol detecting device 1 can compare the BAC value with a first predetermined value to determine whether the BAC value exceeds the standard value. When the BAC value is greater than or equal to the first predetermined value, the alcohol detecting device 1 can determine that the BAC value exceeds the standard value. When the BAC value is less than the first predetermined value, the alcohol detecting device 1 can determine that the BAC value does not exceed the standard value.

At block S03, the alcohol detecting device 1 can send alcohol concentration exceeding information to the photographing device 2 and the locking device 3.

At block S04, the alcohol detecting device 1 can activate the positioning device 11 to acquire location of the driver. And the alcohol detecting device 1 can send the location of the driver to the server 4 and the emergency contact.

In at least one exemplary embodiment, the alcohol detecting device 1 further can determine whether the BAC value is greater than or equal to a second predetermined value. When the BAC value is greater than or equal to the second predetermined value, the driver will be sick after drinking, and the alcohol detecting device 1 can send emergency care information to the server 4 to notify the medical staff or the police.

At block S05, the alcohol detecting device 1 can send the BAC value to the server 4 and detect the physiological parameters of the driver after drinking, and send the physiological parameters to the server 4. Then, the server 4 can analyze health status of the driver according to the physiological parameters.

At block S06, the photographing device 2 can activate the camera 20 to record images and/or a video when receives the alcohol concentration exceeding information.

In at least one exemplary embodiment, the photographing device 2 can activate the display device 21 to display the emergency contact.

At block S07, the locking device 3 can lock or disable a vehicle of the driver. For example, the locking device 3 can lock a throttle and/or a brake and/or a steering wheel of the vehicle.

In at least one exemplary embodiment, the lock 30 can lock a throttle and/or a brake and/or a steering wheel of the vehicle when the locking device 3 receives the alcohol concentration exceeding information. Then, the driver cannot drive the vehicle which can avoid a drunken driving event. For example, when the driver is driving a locomotive, the lock 30 can lock the throttle and/or brake of the locomotive after receiving the alcohol concentration exceeding information from the alcohol detecting device 1. When the driver is driving a vehicle, the lock 30 can lock the steering wheel and/or the brakes of the vehicle after receiving the alcohol concentration exceeding information from the alcohol detecting device 1.

In at least one exemplary embodiment, the server 4 can save the received data (e.g., BAC value) to a database (not shown) and process the data to analyze the health status of the driver. The server 4 can process the data by cleaning data, such as removing invalid data, blank data, repeated data, and so on. The server 4 can perform statistical analysis according to the data; and perform research analysis and advanced statistical analysis based on result of the statistical analysis. For example, lifestyle analysis of the driver.

In at least one exemplary embodiment, the drunken driving detecting system 100 can detect the BAC value in the blood of the drive by contacting with the skin of the driver and perform preset operations according to the BAC value. For example, when the driver is detected to be slightly drinking (the BAC value is less than a first predetermined value), the prompting device of the drunken driving detecting system 100 can send a timely warning to the driver. The prompting device can remind the driver not to drink excessively by vibrating or playing voice.

The drunken driving detecting system 100 further can record daily drinking state of the driver according to the BAC value, and send the recorded daily drinking state to the driver to the server 4. The server 4 can analyze health status of the driver according to the recorded daily drinking state. The drunken driving detecting system 100 further can alert the driver by analyzing the stored health status information and the BAC value. For example, when the BAC value is greater than a threshold that the liver of the driver can withstand (more than 90% of the alcohol in the drinking alcohol is metabolized in the liver), the server 4 can feed back excessive drinking information to the alcohol detecting device 1. And the alcohol detecting device 1 can activate the prompting device to emit a prompt tone to remind the driver to stop drinking, so as to avoid liver discomfort.

The server 4 further can record that the driver is overdose each time (e.g., the alcohol concentration is greater than the second predetermined value), thereby facilitating the driver to perform personal entertainment management. When the driver moderately drinks (the BAC value exceeds the standard value but is less than the second predetermined value), the alcohol detecting device 1 can transmit the moderate drinking information to the photographing device 2 to activate the photographing device 2 to capture the video or image of the driver, and send the video or image to the server 4. The alcohol detecting device 1 further can activate the positioning device 11 to acquire the location of the driver, and transmit the position to the emergency contact. Then, the emergency contact can find the driver as soon as possible. The alcohol detecting device 1 can transmit the moderate drinking information to the locking device 3, automatically opens the lock 30 of the locking device 3 to lock the vehicle driven by the driver, thereby completely implementing the highest principle that drinking is absolutely impossible to drive.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A system comprises:
an alcohol detecting device;
a photographing device; and
a locking device;
wherein the alcohol detecting device comprises:
a storage device;
a microprocessor; and
the storage device storing one or more programs that, when executed by the microprocessor, cause the microprocessor to:
receive a blood alcohol content value of a driver of a vehicle by making contact with the skin of the driver by a sensor of the alcohol detecting device;
determine whether the blood alcohol content value exceeds a first predetermined value;
send alcohol concentration exceeding information to the photographing device to record a video of the driver when the blood alcohol content value exceeds the first predetermined value; and
send the alcohol concentration exceeding information to the locking device to lock the vehicle when the blood alcohol content value exceeds the first predetermined value;
determine whether the blood alcohol content value exceeds a second predetermined value; send emergency care information to the server when the blood alcohol content value exceeds the second predetermined value.

2. The system according to claim 1, wherein the alcohol detecting device further comprises:
a wireless communication device, wherein the alcohol detecting device communicates with a server through the wireless communication device, and sends the blood alcohol content value to the server.

3. The system according to claim 2, wherein the alcohol detecting device further comprises:
a positioning device, wherein the microprocessor activates the positioning device to acquire a location of the driver and send the location to the photographing device and the server.

4. The system according to claim 1, wherein the photographing device comprises:

a display device, which displays emergency contact information when the photographing device receives the alcohol concentration exceeding information.

5. The system according to claim 2, wherein the microprocessor is further caused to:
receive physiological parameters of the driver; and
send the physiological parameters to the server.

6. The system according to claim 1, wherein the locking device comprises:
an indicating device, which is configured to indicate an operating state of a lock, and the operating state of the lock comprises a locked state and an unlocked state.

7. A drunken driving detecting method applicable in an alcohol detecting device, the alcohol detecting device comprising a sensor, the method comprising:
detecting a blood alcohol content value of a driver of a vehicle by making contact with the skin of the driver by the sensor;
determining whether the blood alcohol content value exceeds a first predetermined value; sending alcohol concentration exceeding information to a photographing device to record a video of the driver and to a locking device when the blood alcohol content value exceeds the first predetermined value;
determining whether the blood alcohol content value exceeds a second predetermined value;
and sending emergency care information to a server when the blood alcohol content value exceeds the second predetermined value.

8. The method according to claim 7, wherein the method further comprising:
sending the blood alcohol content value to a server if the blood alcohol content value does not exceed the first predetermined value.

9. The method according to claim 8, wherein the method further comprising:
detecting physiological parameters of the driver; and
sending the physiological parameters to the server.

10. The method according to claim 7, wherein the method further comprising:
recording, via the photographing device, a video when receives the alcohol concentration exceeding information; and
locking, via the locking device, the vehicle when receives the alcohol concentration exceeding information.

11. The method according to claim 10, wherein the method further comprising:
displaying, via the photographing device, emergency contact information when receives the alcohol concentration exceeding information.

12. A non-transitory storage medium having stored thereon instructions that, when executed by a microprocessor of an alcohol detecting device, causes the processor to perform drunken driving detecting method, the alcohol detecting device comprises a sensor, the method comprising:
detecting a blood alcohol content value of a driver of a vehicle by making contact with the skin of the driver by the sensor;
determining whether the blood alcohol content value exceeds a first predetermined value; sending alcohol concentration exceeding information to a photographing device to record a video of the driver and to a locking device when the blood alcohol content value exceeds the first predetermined value;
determining whether the blood alcohol content value exceeds a second predetermined value; and sending emergency care information to a served when the blood alcohol content value exceeds the second predetermined value.

13. The non-transitory storage medium according to claim 12, wherein the method further comprising:
sending the blood alcohol content value to a server if the blood alcohol content value does not exceed the first predetermined value.

14. The non-transitory storage medium according to claim 13, wherein the method further comprising:
detecting physiological parameters of the driver; and
sending the physiological parameters to the server.

15. The non-transitory storage medium according to claim 13, wherein the method further comprising:
recording, via the photographing device, a video when receives the alcohol concentration exceeding information; and
locking, via the locking device, the vehicle when receives the alcohol concentration exceeding information.

16. The non-transitory storage medium according to claim 15, wherein the method further comprising:
displaying, via the photographing device, emergency contact information when receives the alcohol concentration exceeding information.

\* \* \* \* \*